US 9,697,864 B2

(12) United States Patent
Suzuki et al.

(10) Patent No.: US 9,697,864 B2
(45) Date of Patent: Jul. 4, 2017

(54) OPTICAL PICKUP, DISK DRIVE DEVICE, AND OPTICAL ELEMENT DRIVING DEVICE (71) Applicant: SONY CORPORATION, Tokyo (JP)

(72) Inventors: Takaharu Suzuki, Tokya (JP); Hiroshi Ikuta, Chiba (JP); Naoto Ikeda, Kanagawa (JP); Masamichi Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/102,987

(22) PCT Filed: Nov. 11, 2014

(86) PCT No.: PCT/JP2014/079857
§ 371 (c)(1),
(2) Date: Jun. 9, 2016

(87) PCT Pub. No.: WO2015/093186
PCT Pub. Date: Jun. 25, 2015

(65) Prior Publication Data
US 2016/0358624 A1 Dec. 8, 2016

(30) Foreign Application Priority Data
Dec. 20, 2013 (JP) .................. 2013-264350

(51) Int. Cl.
G11B 7/085 (2006.01)
G02B 7/04 (2006.01)
G11B 7/1374 (2012.01)

(52) U.S. Cl.
CPC ............ *G11B 7/08582* (2013.01); *G02B 7/04* (2013.01); *G11B 7/1374* (2013.01)

(58) Field of Classification Search
None
See application file for complete search history.

(56) References Cited

U.S. PATENT DOCUMENTS 8,072,869 B2* 12/2011 Hosoda ................ G11B 7/1378
359/823
8,689,245 B2* 4/2014 Fukushima ......... F16H 57/0497
720/663

FOREIGN PATENT DOCUMENTS

JP 02-149169 U 12/1990
JP 04141610 A * 5/1992
(Continued)

OTHER PUBLICATIONS

English-machine translation of KR Unexamined Publication No. 2019900021025 to Lee et al., published on May 21, 1993.*

*Primary Examiner* — Will J Klimowicz
(74) *Attorney, Agent, or Firm* — Chip Law Group (57) ABSTRACT

[Object] To prevent the occurrence of stuck without increasing the number of components and also to restore thread engagement of a rack with a lead screw to a normal condition.

[Solution] Provided is an optical pickup including: a light source; an objective lens; an optical element; and an optical element driving device. The optical element driving device includes a lead screw having a threaded engagement portion with a thread groove formed in the threaded engagement portion, a drive unit configured to allow the lead screw to rotate, a thrust bearing configured to support an end portion of the lead screw on a side opposite to the drive unit in an axial direction of the lead screw, and a rack having a plurality of first tooth portions provided spaced apart in the axial direction to be threadably engaged with the threaded engagement portion and a second tooth portion provided closer to the thrust bearing in the axial direction than the first tooth portion to be threadably engaged with the threaded engagement portion, the first tooth portion and the second tooth portion being positioned on opposite sides across the lead screw, the rack being moved in the axial direction with (Continued)

a rotation of the lead screw. The lead screw includes a non-threaded engagement portion formed at the end portion of the lead screw on the thrust bearing side, the non-threaded engagement portion having no thread groove.

10 Claims, 9 Drawing Sheets

(56) References Cited

FOREIGN PATENT DOCUMENTS

| | | | | |
|---|---|---|---|---|
| JP | 09-258087 A | 10/1997 | | |
| JP | 10-228736 A | 8/1998 | | |
| JP | EP 1058243 A1 * | 12/2000 | ......... | F16H 25/2409 |
| JP | 2006-172661 A | 6/2006 | | |
| JP | 2007206196 A * | 8/2007 | | |
| JP | 2007-287281 A | 11/2007 | | |
| JP | 2008-027557 A | 2/2008 | | |
| JP | 2010009744 A * | 1/2010 | | |
| JP | 2010282693 A * | 12/2010 | | |
| JP | 2011-232406 A | 11/2011 | | |
| NL | WO 2006100619 A2 * | 9/2006 | ......... | F16H 25/2009 |
| TW | 472934 U | 1/2002 | | |
| TW | 200606898 B | 2/2006 | | |
| TW | I300222 B | 8/2008 | | |

* cited by examiner

FIG. 9

OPTICAL PICKUP, DISK DRIVE DEVICE, AND OPTICAL ELEMENT DRIVING DEVICE

CROSS REFERENCE TO RELATED APPLICATIONS

This application is a U.S. National Phase of International Patent Application No. PCT/JP2014/079857 filed on Nov. 11, 2014, which claims priority benefit of Japanese Patent Application No. JP 2013-264350 filed in the Japan Patent Office on Dec. 20, 2013. Each of the above-referenced applications is hereby incorporated herein by reference in its entirety.

TECHNICAL FIELD

The present technology relates to a technical field for an optical pickup, disk drive device, and optical element driving device that allow the rotation of a lead screw by a driving force of a drive unit to move an optical element in a predetermined direction.

CITATION LIST

Patent Literature

Patent Literature 1: JP 2007-287281A

BACKGROUND ART

In an optical element driving device, an optical element such as a lens and a diaphragm is moved in a predetermined direction by a driving force of a drive motor. The optical element driving device is provided in, for example, a disk drive device having an optical pickup, an imaging device such as a still camera and video camera, or a camera module incorporated in a mobile terminal.

For example, the disk drive device performs recording or reproduction of an information signal on a disk-shaped recording medium such as an optical disk and a magneto-optical disk. Upon the recording and reproduction of an information signal, the optical pickup is moved in the radial direction of the disk-shaped recording medium. The optical pickup includes a moving base guided and moved by, for example, a guide shaft in the radial direction of the disk-shaped recording medium and an objective lens driving device arranged on the moving base, and the irradiation light traveling through the objective lens is focused on a recording surface of the disk-shaped recording medium.

Examples of the optical element driving device provided in the disk drive device include a device that is moved by a lead screw used to allow a given lens arranged in the optical pickup to rotate by a driving force of a drive motor (e.g., refer to Patent Literature 1).

In the optical element driving device disclosed in Patent Literature 1, a nut is threadably engaged with a lead screw, and a lens holder which holds a lens and is formed integrally with the nut is moved in the axial direction of the lead screw by feeding the nut with the rotation of the lead screw. The lead screw has one end portion that is connected to a drive unit of the drive motor and the other end portion that is placed and rotatably supported on a thrust bearing.

In the optical element driving device using such a lead screw, the nut may be excessively moved and even in contact with the thrust bearing due to defects in control software or a detector, and a reaction force to the opposite side of the thrust bearing is applied to the lead screw and the drive unit. Thus, a portion of the drive unit is pressed against the inner surface of a casing of the drive motor during rotation and the rotation of the drive motor may be disabled, which is called stuck.

Thus, in the optical element driving device disclosed in Patent Literature 1, a nut idling portion is formed on both end portions in the axial direction of the lead screw to allow idle rotation of the nut. In addition, a nut return spring is provided to allow the nut to be threadably engaged with a threaded engagement portion of the lead screw, thereby preventing the occurrence of stuck. Thus, when the nut is fed to the end portion in the axial direction of the lead screw, the nut is idling with the lead screw by the nut idling portion, thereby preventing the occurrence of stuck. In addition, the nut is biased toward the threaded engagement portion by the nut return spring, and when the lead screw rotates in the opposite direction after the idling of the nut, the nut is threadably engaged with the threaded engagement portion and the thread engagement is restored to a normal condition.

SUMMARY OF INVENTION

Technical Problem

However, in the optical element driving device disclosed in Patent Literature 1, it is necessary to provide the nut return spring to restore the thread engagement of the nut with the lead screw to the normal condition, and accordingly, the number of components increases, which undesirably causes an increase in manufacturing cost. In addition, if the nut pressed by the nut return spring is inclined, the restoration of the thread engagement to the normal condition may be impossible. Further, a non-threaded engagement portion is provided at both sides of the lead screw and the nut is not mechanically abutted on the drive motor side and the thrust bearing, and thus it is not possible to detect a mechanical abutting portion as the initial position. For this reason, it is necessary to provide an additional detector for detecting the position of the nut, which undesirably causes an increase in manufacturing cost.

Therefore, the optical pickup, the disk drive device, and the optical element driving device according to the present technology overcome the problems described above, and are intended to prevent the occurrence of stuck without increasing the number of components and also to restore thread engagement of a rack with a lead screw to a normal condition.

Solution to Problem

Firstly, in order to solve the above problems, an optical pickup according to the present technology includes: a light source configured to emit a light beam; an objective lens configured to focus the light beam emitted from the light source onto a recording surface of a disk-shaped recording medium; an optical element arranged between the light source and the objective lens, the optical element having predetermined refractive power; and an optical element driving device configured to move the optical element along an optical axis direction. The optical element driving device includes a lead screw having a threaded engagement portion with a thread groove formed in the threaded engagement portion, a drive unit configured to allow the lead screw to rotate, a thrust bearing configured to support an end portion of the lead screw on a side opposite to the drive unit in an axial direction of the lead screw, and a rack having a plurality of first tooth portions provided spaced apart in the axial direction to be threadably engaged with the threaded engagement portion and a second tooth portion provided closer to the thrust bearing in the axial direction than the first tooth portion to be threadably engaged with the threaded engagement portion, the first tooth portion and the second tooth portion being positioned on opposite sides across the lead screw, the rack being moved in the axial direction with a rotation of the lead screw. The lead screw includes a non-threaded engagement portion formed at the end portion of the lead screw on the thrust bearing side, the non-threaded engagement portion having no thread groove.

Accordingly, in the optical element driving device, the second tooth portion is positioned facing the non-threaded engagement portion in the state where the rack is moved to the end portion of the lead screw on the side of the thrust bearing.

Secondly, in the above optical pickup according to the present technology, it is preferable that the first tooth portion be threadably engaged with the threaded engagement portion of the lead screw and the second tooth portion face the non-threaded engagement portion of the lead screw when the rack is moved closest to the thrust bearing within a movable range of the rack.

Accordingly, the rack is idling with the lead screw. In addition, when the lead screw rotates in the opposite direction after the idling, the rack and the lead screw are normally threadably engaged with each other, and the rack is moved.

Thirdly, in the above optical pickup according to the present technology, it is preferable that the first tooth portion and the second tooth portion be both threadably engaged with the threaded engagement portion of the lead screw when the rack is moved closest to the drive unit within a movable range of the rack.

Accordingly, when the rack is moved closest to the drive unit within a movable range of the rack, the rotation of the rack is stopped. In addition, the position where the rack is stopped is determined depending on a mechanical precision, and thus it is possible to know an exact position of the rack even without an additional detector.

Fourthly, in the above optical pickup according to the present technology, it is preferable that a pressing spring configured to allow the first tooth portion to be biased in a direction to be pressed against the threaded engagement portion be further included.

Accordingly, the rack is fed with the rotation of the lead screw in the state where the first tooth portion is pressed against the threaded engagement portion.

Fifthly, in the above optical pickup according to the present technology, it is preferable that the rack be provided with a base surface portion and a pair of toothed portions projecting respectively from both end portions of the base surface portion, the base surface portion and the pair of toothed portions be integrally formed, and the first tooth portion and the second tooth portion be integrally formed respectively in the pair of toothed portions.

Accordingly, the base surface portion, the first toothed portion, the second toothed portion, the first tooth portion, and the second tooth portion are formed integrally.

Sixthly, in the above optical pickup according to the present technology, it is preferable that the drive unit be a drive unit of a stepping motor.

Accordingly, the amount of rotation of the lead screw is easy to be controlled.

Seventhly, in the above optical pickup according to the present technology, it is preferable that the optical pickup be provided with a detector configured to detect counter-electromotive force generated with a rotation of the drive unit, and, when the rack is moved toward the drive unit and no counter-electromotive force is detected by the detector, a direction of rotation of the drive unit be reversed and the rack be moved toward the thrust bearing.

Accordingly, the movement of the rack is determined to be stopped when no counter-electromotive force is detected.

Firstly, in order to solve the above problems, a disk drive device according to the present technology includes: an optical pickup configured to be moved in a radial direction of a disk-shaped recording medium; and a disk table having the disk-shaped recording medium mounted on the disk table. The optical pickup includes a light source configured to emit a light beam, an objective lens configured to focus the light beam emitted from the light source onto a recording surface of a disk-shaped recording medium, an optical element arranged between the light source and the objective lens, the optical element having predetermined refractive power, and an optical element driving device configured to move the optical element along an optical axis direction. The optical element driving device includes a lead screw having a threaded engagement portion with a thread groove formed in the threaded engagement portion, a drive unit configured to allow the lead screw to rotate, a thrust bearing configured to support an end portion of the lead screw on a side opposite to the drive unit in an axial direction of the lead screw, and a rack having a plurality of first tooth portions provided spaced apart in the axial direction to be threadably engaged with the threaded engagement portion and a second tooth portion provided closer to the thrust bearing in the axial direction than the first tooth portion to be threadably engaged with the threaded engagement portion, the first tooth portion and the second tooth portion being positioned on opposite sides across the lead screw, the rack being moved in the axial direction with a rotation of the lead screw. The lead screw includes a non-threaded engagement portion formed at the end portion of the lead screw on the thrust bearing side, the non-threaded engagement portion having no thread groove.

Accordingly, in the optical element driving device of the optical pickup, the second tooth portion is positioned facing the non-threaded engagement portion in the state where the rack is moved to the end portion of the lead screw on the side of the thrust bearing.

Secondly, in the above disk drive device according to the present technology, it is preferable that the disk drive device be provided with a detector configured to detect counter-electromotive force generated with a rotation of the drive unit, and, when the rack is moved toward the drive unit and no counter-electromotive force is detected by the detector, a direction of rotation of the drive unit be reversed and the rack be moved toward the thrust bearing.

Accordingly, the movement of the rack is determined to be stopped when no counter-electromotive force is detected. In addition, it is possible to know exactly the position of the rack at that time.

In order to solve the above problems, an optical element driving device according to the present technology includes: a lead screw having a threaded engagement portion with a thread groove formed in the threaded engagement portion; a drive unit configured to allow the lead screw to rotate; a thrust bearing configured to support an end portion of the lead screw on a side opposite to the drive unit in an axial direction of the lead screw; and a rack having a plurality of first tooth portions provided spaced apart in the axial direction to be threadably engaged with the threaded engagement portion and a second tooth portion provided closer to the thrust bearing in the axial direction than the first tooth portion to be threadably engaged with the threaded engagement portion, the first tooth portion and the second tooth portion being positioned on opposite sides across the lead screw, the rack being moved in the axial direction with a rotation of the lead screw. The lead screw includes a non-threaded engagement portion formed at the end portion of the lead screw on the thrust bearing side, the non-threaded engagement portion having no thread groove.

Accordingly, the second tooth portion is positioned facing the non-threaded engagement portion in the state where the rack is moved to the end portion of the lead screw on the side of the thrust bearing.

Advantageous Effects of Invention

In the optical pickup of the present technology, the second tooth portion is positioned facing the non-threaded engagement portion in the state where the rack is moved to the end portion of the lead screw on the side of the thrust bearing. Thus, it is possible to prevent the occurrence of stuck without increasing the number of components and to restore the thread engagement of the rack with the lead screw to a normal condition.

Note that the advantageous effects described herein are illustrative rather than restrictive and any other effects may be achieved.

DESCRIPTION OF EMBODIMENTS

Hereinafter, modes for carrying out an optical pickup, disk drive device, and optical element driving device according to the present technology will be described with reference to the appended drawings.

In the following description, the vertical, longitudinal, and lateral directions are indicated by defining the axial direction of a disk-shaped recording medium as the vertical direction and by defining the direction of movement of an optical pickup as the longitudinal direction.

Note that the vertical, longitudinal, and lateral directions are for description purpose only, and the implementations of the present technology are not limited to theses directions.

[Schematic Configuration of Disk Drive Device]

Figure 1:
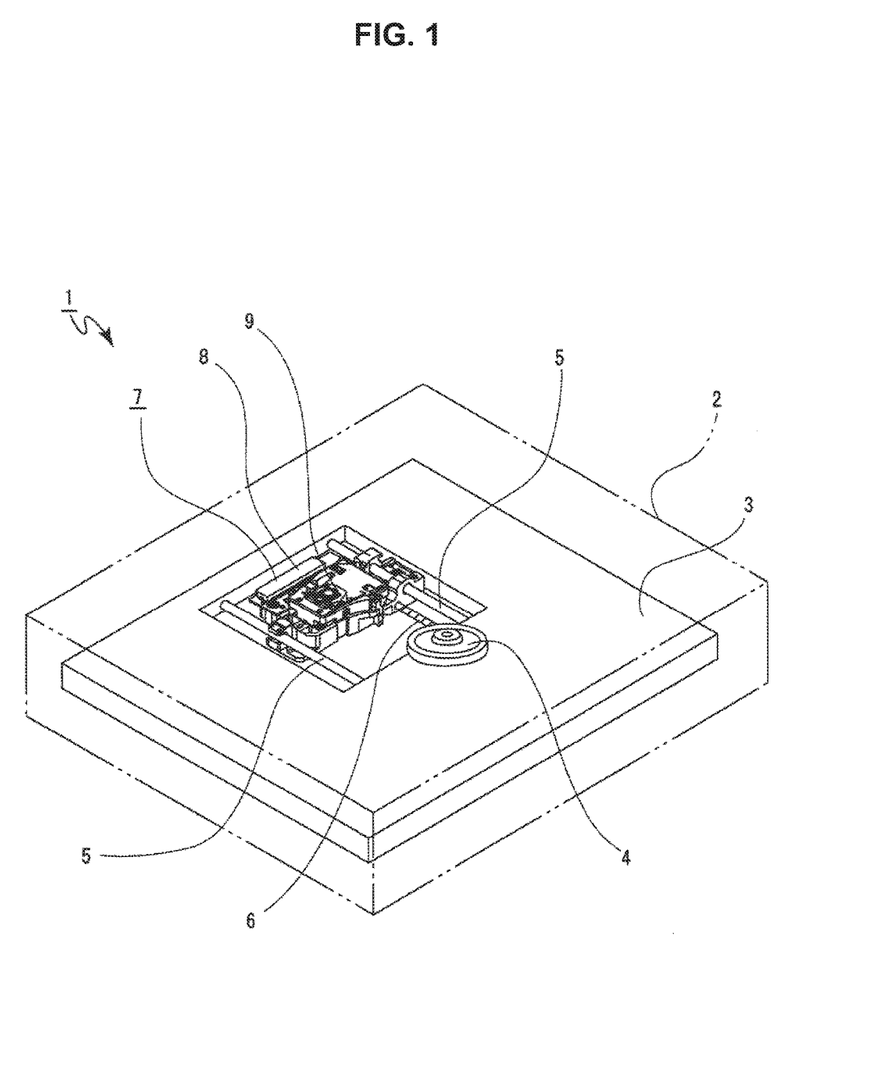
FIG. 1 illustrates a mode for carrying out an optical pickup, a disk drive device, and an optical element driving device according to the present disclosure together with FIGS. 2 to 9, and this figure is a schematic perspective view of the disk drive device.

A disk drive device 1 is configured to include necessary members and mechanisms arranged inside an outer housing 2 (refer to FIG. 1). The outer housing 2 includes a disk insertion opening (not shown) formed therein.

The outer housing 2 includes a chassis 3 arranged therein, and a disk table 4 is fixed to a motor shaft of a spindle motor attached to the chassis 3. Parallel guide shafts 5 and 5 are attached to the chassis 3, and a feed screw 6 rotates by a feed motor (not shown) and is supported on the chassis 3.

Figure 2:
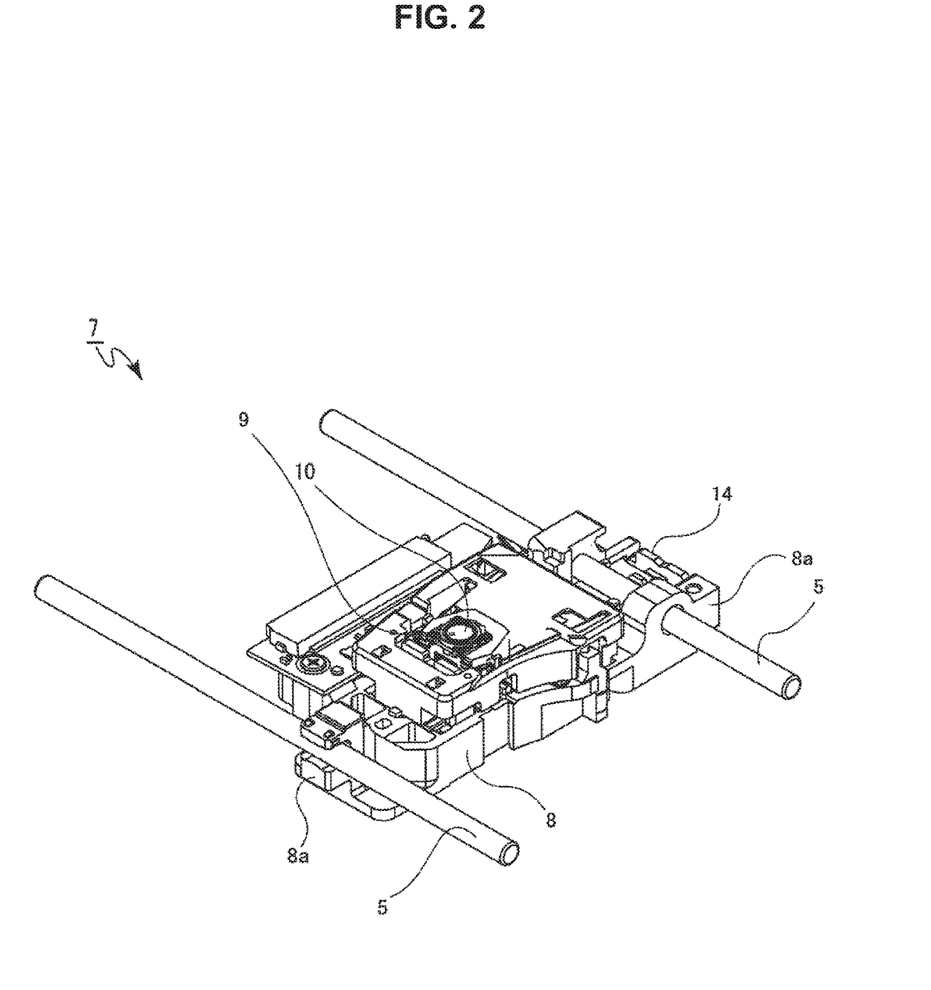
FIG. 2 is an enlarged perspective view illustrating the optical pickup.

An optical pickup 7 is supported on the chassis 3 so that the optical pickup 7 moves freely in the radial direction (longitudinal direction) of the disk-shaped recording medium 100. The optical pickup 7 is configured to include a moving base 8, a necessary optical component provided in the moving base 8, and an objective lens driving device 9 arranged in the moving base 8, as illustrated in FIG. 2. The optical pickup 7 includes bearings 8a and 8a that are provided respectively on the left and right end portions of the moving base 8 and are supported slidably with the guide shafts 5 and 5, respectively.

When a nut member (not shown) provided on the moving base 8 is threadably engaged with the feed screw 6 and then the feed screw 6 rotates by the feed motor, the nut member is fed in the direction corresponding to the direction of rotation of the feed screw 6, and the optical pickup 7 is moved in the radial direction of the disk-shaped recording medium 100 mounted on the disk table 4.

The optical pickup 7 is capable of recording and reproducing an information signal on different types of disk-shaped recording medium 100, for example, compact disc (CD) with an operation wavelength of approximately 780 nm laser light, digital versatile disc (DVD) with an operation wavelength of approximately 660 nm, and Blu-ray (registered trademark) disc with an operation wavelength of approximately 405 nm.

The objective lens driving device 9 includes an objective lens 10 attached thereto.

Figure 3:
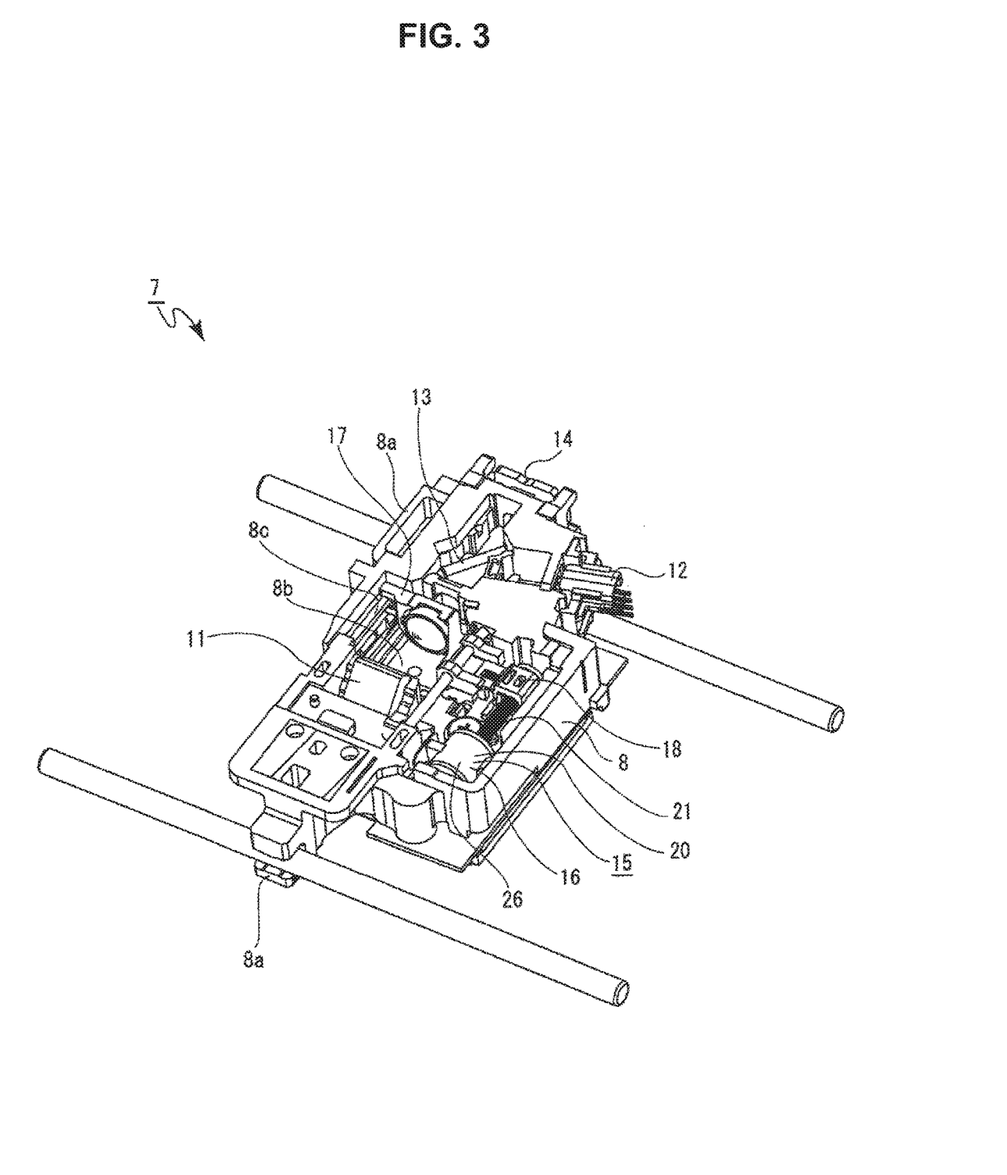
FIG. 3 is an enlarged perspective view illustrating the optical pickup as viewed from a direction different from that in FIG. 2.
Figure 4:
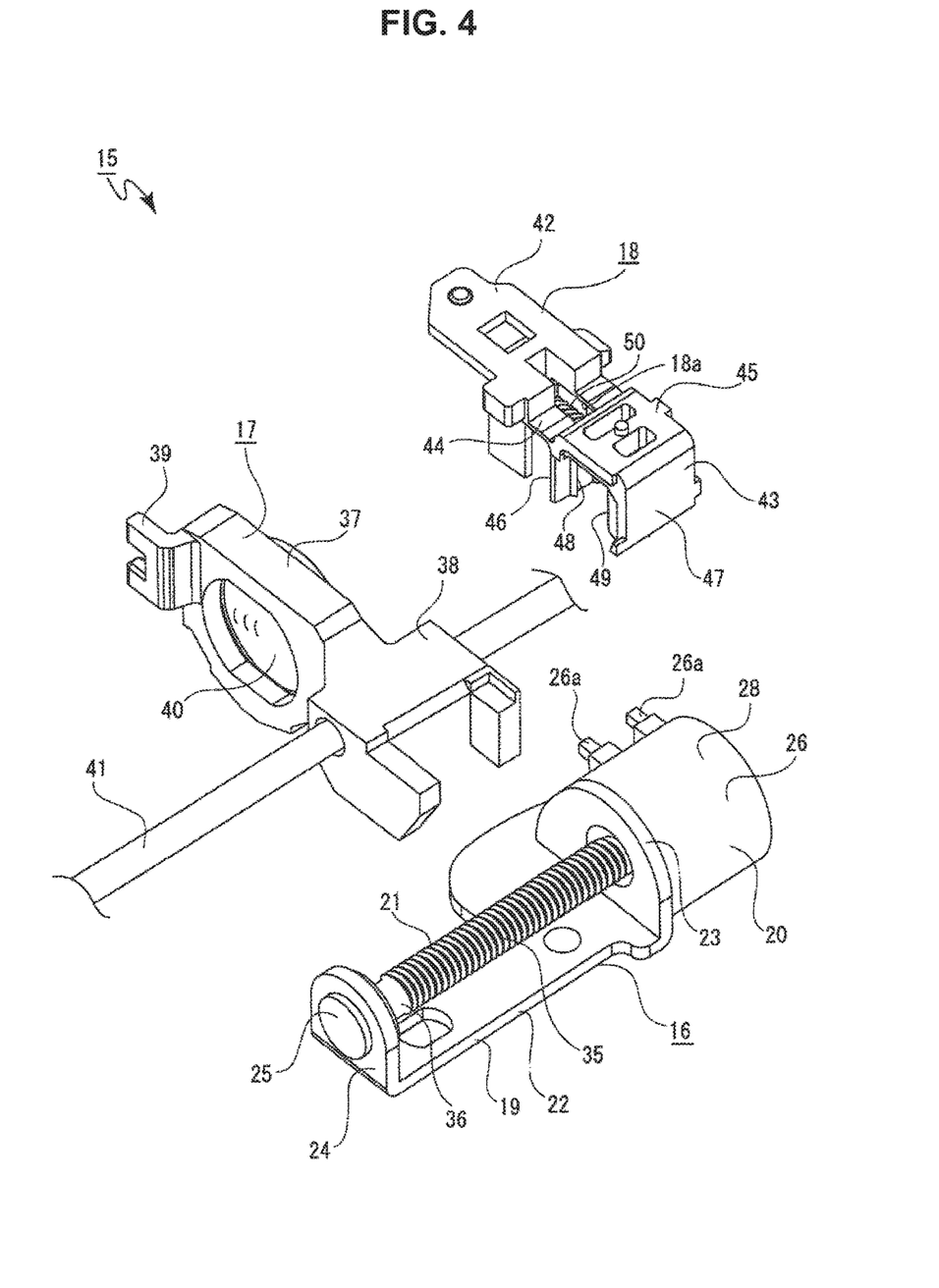
FIG. 4 is an enlarged exploded perspective view of the optical element driving device.
Figure 5:
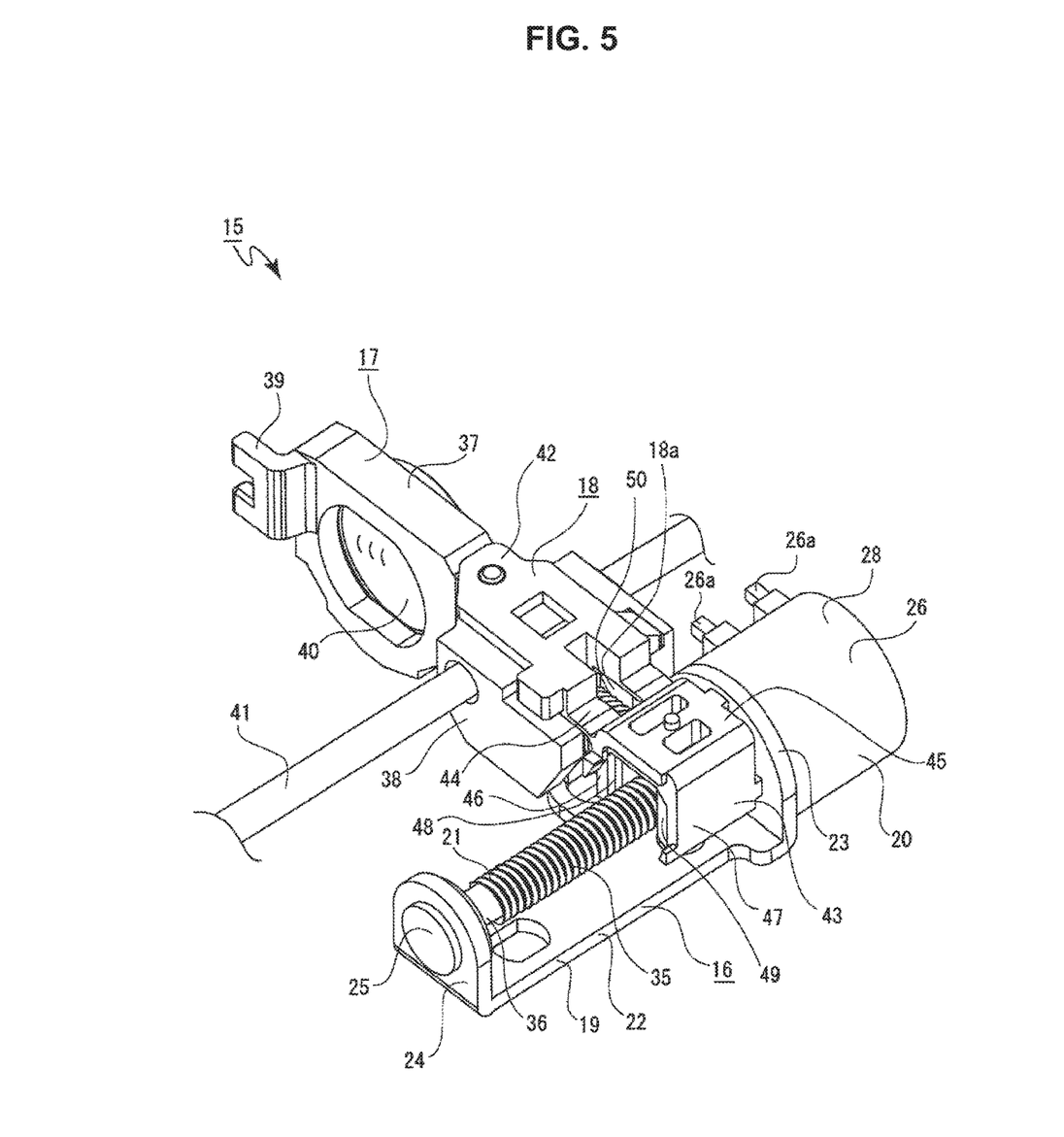
FIG. 5 is an enlarged perspective view of the optical element driving device.
Figure 6:
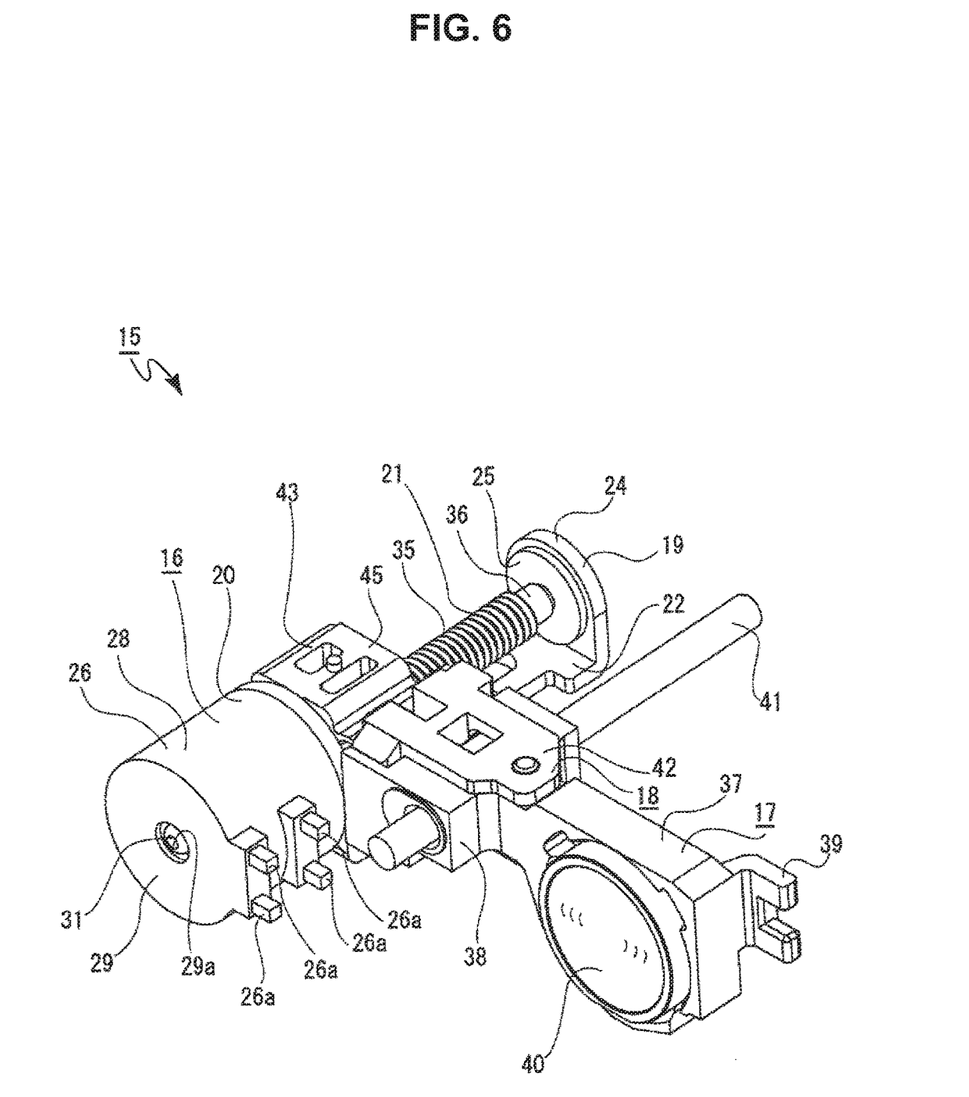
FIG. 6 is an enlarged perspective view illustrating the optical element driving device as viewed from a direction different from that in FIG. 5.

The moving base 8 includes an arrangement recess 8b that is formed in the moving base 8 and is opened downwardly (refer to FIG. 3). The moving base 8 is provided with a guide ridge 8c extending in the lateral direction. The guide ridge 8c is provided on the side surface where the arrangement recess 8b is formed.

The moving base 8 includes a standing mirror 11 arranged below the objective lens 10. The moving base 8 includes a light emitting portion 12, a beam splitter 13, and a light receiving portion 14 which are arranged at respective predetermined positions. An example of the light emitting portion 12 includes a semiconductor laser.

The light (laser light) is emitted from the light emitting portion 12, changes its path by the beam splitter 13, and is incident on the standing mirror 11. Then, the light is reflected at 90° by the standing mirror, and a recording surface of the disk-shaped recording medium 100 is irradiated with the reflected light through the objective lens 10. In this case, the objective lens driving device 9 performs the focusing adjustment and tracking adjustment on the irradiation light traveling through the objective lens 10 so that the spot of the irradiation light is focused on the recording surface of the disk-shaped recording medium 100.

The light incident on the recording surface of the disk-shaped recording medium 100 is reflected from the recording surface, and then is incident on the standing mirror 11 through the objective lens. Then, the light is reflected at 90° by the standing mirror, is transmitted through the beam splitter 13, and is incident on the light receiving portion 14.

In the disk drive device 1, when the disk table 4 rotates with the rotation of the spindle motor, the disk-shaped recording medium 100 mounted on the disk table 4 rotates, and at the same time, the optical pickup 7 is moved in the radial direction of the disk-shaped recording medium 100. Then, the optical pickup 7 performs the recording and reproduction of an information signal on the disk-shaped recording medium 100 based on the light incident on the light receiving portion 14.

[Configuration of Optical Element Driving Device]

An optical element driving device 15 is arranged in the arrangement recess 8*b* formed in the moving base 8 of the optical pickup 7. The optical element driving device 15 includes a motor unit 16, an element holder 17, and a coupling member 18 (refer to FIGS. 4 to 7).

The motor unit 16 includes a mounting bracket 19, a drive motor 20, and a lead screw 21.

The mounting bracket 19 includes a horizontally long base portion 22 facing in the vertical direction, a motor mounting portion 23 that projects downward from its one end portion in the longitudinal direction of the base portion 22 that projects downward from the other end portion in the longitudinal direction of the base portion 22, and a bearing mounting portion 24. The motor mounting portion 23 includes a through-hole 23*a* that is formed in the motor mounting portion 23 and passes through it from side to side. The bearing mounting portion 24 has a thrust bearing 25 attached thereto.

The base portion 22 of the mounting bracket 19 is attached to the moving base 8 by a fastening screw or the like.

The drive motor 20 is attached to the outer surface of the motor mounting portion 23. The drive motor 20 includes a casing 26 and a drive unit 27 arranged inside the casing 26 (refer to FIG. 7). The drive motor 20 is typically a stepping motor, but is not limited thereto. In addition, the drawings are schematic views, and components such as a radial bearing not illustrated may be included.

The casing 26 includes a cylindrical circumferential surface portion 28, an outer blocking surface portion 29 that blocks one opening of the circumferential portion 28, and an inner blocking surface portion 30 that blocks the other opening of the circumferential portion 28. The inner blocking surface portion 30 is attached in a state where it is in contact with the motor mounting portion 23. The outer blocking surface portion 29 includes an arrangement hole 29*a* formed in the center. The inner blocking surface portion 30 includes an insertion hole 30*a* formed in the center.

The casing 26 includes terminal portions 26*a*, 26*a*, . . . , attached thereto (refer to FIGS. 4 to 6) for supplying the power to a drive unit 27.

Figure 7:
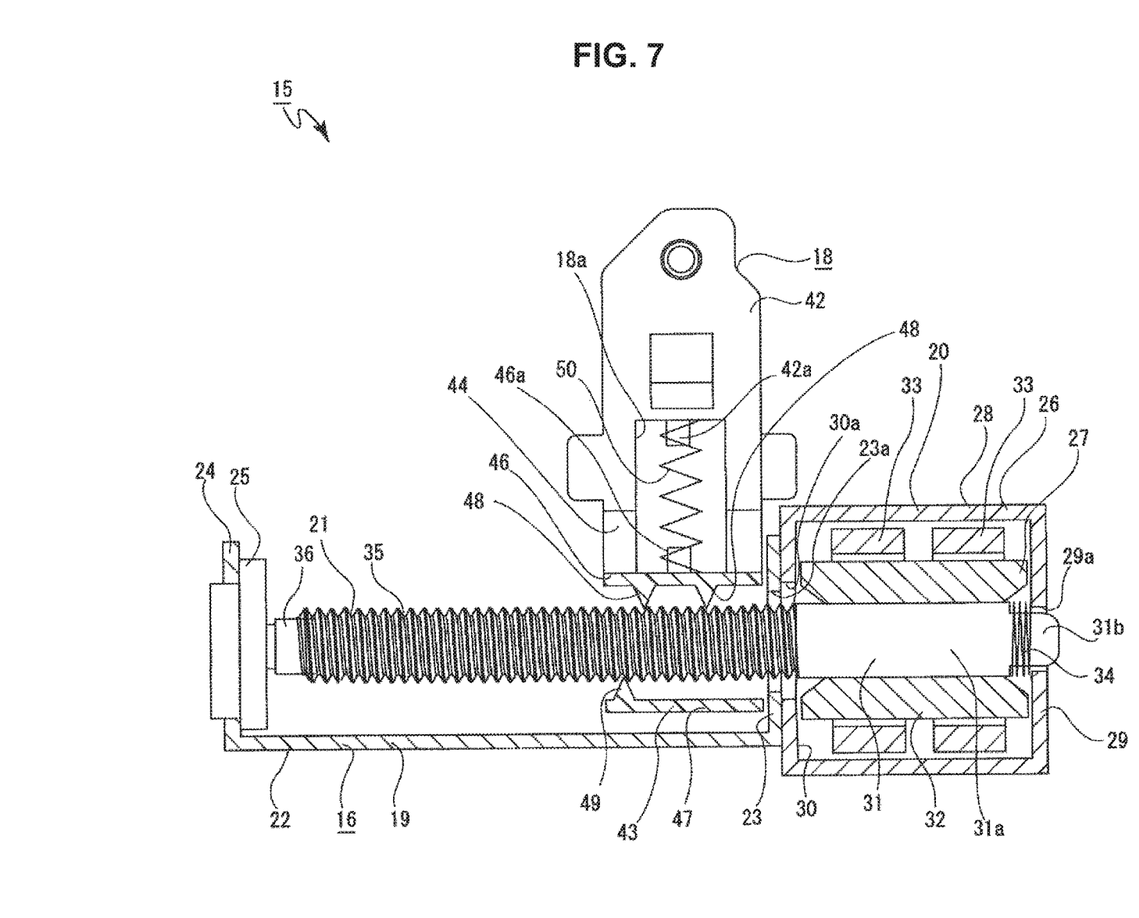
FIG. 7 is an enlarged bottom view of the optical element driving device illustrated as a partial cross section.

The drive unit 27 includes a drive shaft 31, a substantially cylindrical drive magnet 32 that is externally fitted and attached to the drive shaft 31, and drive coils 33 and 33 that are arranged on the outer circumferential side of the drive magnet 32 (refer to FIG. 7). The portions other than one end portion in the axial direction of the drive shaft 31 are provided as a mounting portion 31*a* to which the drive magnet 32 is attached, and the one end portion of the drive shaft 31 is provided as a spring support portion 31*b* that has a smaller diameter than the mounting portion 31*a*. The spring support portion 31*b* is partially arranged in the arrangement hole 29*a* of the casing 26.

The spring support portion 31*b* of the drive shaft 31 supports a biasing spring 34. The biasing spring 34 is a compression coil spring as one example. The biasing spring 34 has one end that is pressed against the inner surface of the outer blocking surface portion 29 in the casing 26 and the other end that presses against the one end surface of the mounting portion 31*a*. Thus, the drive unit 27 is biased toward the side of the thrust bearing 25 by the biasing spring 34.

The drive magnet 32 rotates in the casing 26 with a predetermined clearance defined between the drive magnet and the inner surface of the casing 26. The drive magnet 32 rotates by the drive current supplied through the terminal portions 26*a*, 26*a*, . . . to the drive coils 33 and 33.

The lead screw 21 extends to the left and right. The lead screw 21 has one end portion in the axial direction that is inserted the axial direction through the through-hole 23*a* formed in the motor mounting portion 23 of the mounting bracket 19 and the insertion hole 30*a* formed in the inner blocking surface portion 30 of the casing 26. The lead screw 21 has the other end portion in the axial direction that is placed and rotatably supported on the thrust bearing 25. One end of the lead screw 21 in the axial direction is connected to the other end in the axial direction of the drive shaft 31, and thus the lead screw 21 is biased toward the thrust bearing 25 through the drive shaft 31 by the biasing spring 34. The other end surface in the axial direction of the lead screw 21 is pressed against the thrust bearing 25.

In the lead screw 21, portions other than the other end portion in the axial direction are provided as a threaded engagement portion 35 having a thread groove, and the other end portion in the axial direction is provided as a non-threaded engagement portion 36 having no thread groove (refer to FIGS. 4 to 7).

The lead screw 21 is connected to the drive shaft 31 of the drive unit 27, and thus the lead screw 21 rotates by the driving force of the drive motor 20. The lead screw 21 may be formed integrally with the drive shaft 31.

The element holder 17 is formed in a longitudinally long shape extending in the longitudinal direction. The element holder 17 is constructed of respective parts formed integrally with each other, and is configured to include a tubular element holding portion 37 that passes through it from side to side, a guided portion 38 that is communicated with the element holding portion 37, and a guided projection 39 that projects from the element holding portion 37.

The element holding portion 37 holds an optical element 40. The optical element is a collimator lens as one example, and has a function to convert incident light into substantially parallel light.

The guided portion 38 is slidably supported on a guide shaft 41 that extends in the lateral direction. The both end portions in the axial direction of the guide shaft 41 are attached to the moving base 8, with the guide shaft 41 arranged in the arrangement recess 8*b* formed in the moving base 8. The guided projection 39 is slidably supported on the guide ridge 8*c* of the moving base 8.

Thus, the element holder 17 and the optical element 40 held by the element holder 17 are moved in the lateral direction while being guided by the guide shaft 41 and the guide ridge 8*c*.

The optical element 40 is positioned between the beam splitter 13 and the standing mirror 11 in the path of the light emitted from the light emitting portion 12 and is moved to the respective predetermined positions in the lateral direction depending on the type of the disk-shaped recording medium 100 on which the recording and reproduction are performed. The movement of the optical element 40 to the respective predetermined positions in the lateral direction depending on the type of the disk-shaped recording medium 100 allows the divergence angle or convergence angle of light incident on the objective lens 10 to be changed, thereby correcting the spherical aberration caused when the recording and reproduction operation is performed on different kinds of the disk-shaped recording medium 100 or the same kind of the disk-shaped recording medium 100 having different thicknesses of individual light transmitting layers due to variations. Thus, a satisfactory recording and reproduction operation is performed on any types of the disk-shaped recording medium 100.

The coupling member 18 is made of a resin material and is formed in a longitudinally long shape extending in the longitudinal direction. The coupling member 18 is constructed of respective parts formed integrally with each other, and is configured to include an attached portion 42 that is attached to the element holder 17, a rack 43 that is threadably engaged with the lead screw 21, and a connecting portion 44 that connects the attached portion 41 to the rack 43. The coupling member 18 includes a spring arrangement hole 18a formed in the position from the end portion of the attached portion 42 at the connecting portion 44 to the connecting portion 44. The spring arrangement hole 18a is formed to extend in the longitudinal direction while passing through vertically.

The attached portion 42 is provided with a spring support projection 42a that projects toward the rack 43, and the spring support projection 42a is positioned in the spring arrangement hole 18a. The attached portion 42 is attached to the guided portion 38 from its lower side.

The rack 43 is configured to include a base surface portion 45 that faces the vertical direction, a first toothed portion 46 that projects downward from one end portion in the longitudinal direction of the base surface portion 45, and a second toothed portion 47 that projects downward from the other end portion in the longitudinal direction of the base surface portion 45. The base surface portion 45, the first toothed portion 46, and the second toothed portion 47 are formed integrally into a U shape.

The first toothed portion 46 is positioned closer to the side of the element holding portion 37 of the element holder 17 than the second tooth portion 47. The first toothed portion 46 is provided with a spring support projection 46a that projects toward the attached portion 42, and the spring support projection 46a is positioned in the spring arrangement hole 18a.

The first toothed portion 46 is provided with a plurality of first tooth portions 48, 48, . . . , for example, two first tooth portions 48 and 48 formed on a surface of the first toothed portion 46 facing the second toothed portion 47. The first tooth portions are integrally spaced apart from each other in the lateral direction. The first tooth portions 48 and 48 extend in the lateral direction and have a tapered shape.

The second toothed portion 47 is provided with a second tooth portion 49 formed on a surface of the second toothed portion 47 facing the first toothed portion 46. The second tooth portion 49 extends in the vertical direction and has a tapered shape. The second tooth portion 49 is positioned on the left side of the first tooth portions 48 and 48.

The connecting portion 44 is formed in a plate shape facing in the vertical direction, and has an upper end portion and a lower end portion that are connected to the attached portion 42 and the rack 43, respectively. The connecting portion 44 is formed to have a thin thickness that is smaller than those of the base surface portion 45, the first toothed portion 46, and the second toothed portion 47. Thus, the connecting portion 44 is easily elastically deformed in the substantially vertical direction.

The coupling member 18 includes a pressing spring 50 arranged in the spring arrangement hole 18a. The pressing spring 50 is a compression coil spring as one example, and is arranged in the spring arrangement hole 18a with either end portion supported on the spring support projection 42a of the attached portion 42 and on the spring support projection 46a of the first toothed portion 46.

As described above, the connecting portion 44 is formed to have a thin thickness and is easily elastically deformed in the substantially vertical direction, and the base surface portion 45, the first toothed portion 46, and the second toothed portion 47 formed in a U shape are biased in a direction to be pressed against the lead screw 21 by the pressing spring 50. This allows the first tooth portions 48 and 48 provided in the first toothed portion 46 to be pressed against the leas screw 21.

In the state where the coupling member 18 is attached to the element holder 17, the rack 43 is assembled into the leas screw 21 from below. The first tooth portions 48 and 48 are threadably engaged with the threaded engagement portion 35, with the first tooth portions 48 and 48 and the second tooth portion 49 positioned on both sides across the lead screw in the longitudinal direction. In this case, the first tooth portions 48 and 48 are biased in a direction approaching the second tooth portion 49 by the pressing spring 50, and thus the first tooth portions 48 and 48 are threadably engaged with the threaded engagement portion 35 while being pressed against the threaded engagement portion 35.

[Operation of Optical Element Driving Device]

When the lead screw 21 rotates by the driving force of the drive motor 20, the first tooth portions 48 and 48 and the second tooth portion 49 are fed in a direction corresponding to the direction of rotation of the lead screw 21. The element holder 17, the coupling member 18, and the optical element 40 are guided by the guide shaft 41 and the guide ridge 8c and are integrally moved in the lateral direction.

In the disk drive device 1, prior to the recording and reproduction operation performed on the disk-shaped recording medium 100, the drive motor 20 rotates, and the rack 43 is fed to the drive motor 20 and presses the rack 43 against the motor mounting portion 23 of the mounting bracket 19. Thus, the rack 43 is stopped for a predetermined time. The position at this time is determined as the initial position of the rack 43. The direction of rotation and the amount of rotation of the drive motor 20 are controlled based on the initial position of the rack 43, and thus the position of movement of the optical element 40 which is integrally moved with the rack 43 is determined. The use of a stepping motor as the drive motor 20 makes it possible to control the amount of rotation with high accuracy, and thus it is also possible to improve the accuracy of the position of the movement of the optical element 40. In addition, the initial position is uniquely determined in the state where the rack 43 is pressed against the motor mounting portion 23, and thus it is possible to eliminate the necessity to provide a separate position detection sensor, thereby reducing the cost.

However, for example, if foreign matters such as dust enter between the rack 43 and the threaded engagement portion 35 of the lead screw 21, the rack 43 will probably be stopped before the rack 43 is pressed against the motor mounting portion 23, which may cause errors in detecting the initial position of the rack 43.

Upon the occurrence of such failure, the initial position of the rack 43 is shifted. When the rack 43 is fed to the thrust bearing 25 by rotating the lead screw 21 by the drive motor 20 by a predetermined amount of rotation, the rack 43 may be excessively moved and pressed against the thrust bearing 25. When the rack 43 is pressed against the thrust bearing 25, the lead screw 21 is subjected to the force in the opposite direction. Thus, the drive unit 27 is pressed against the inner surface of the outer blocking surface portion 29 in the casing 26, which causes stuck, resulting in the state where the drive unit 27 is not moved by the driving force of the drive motor 20.

Figure 8:
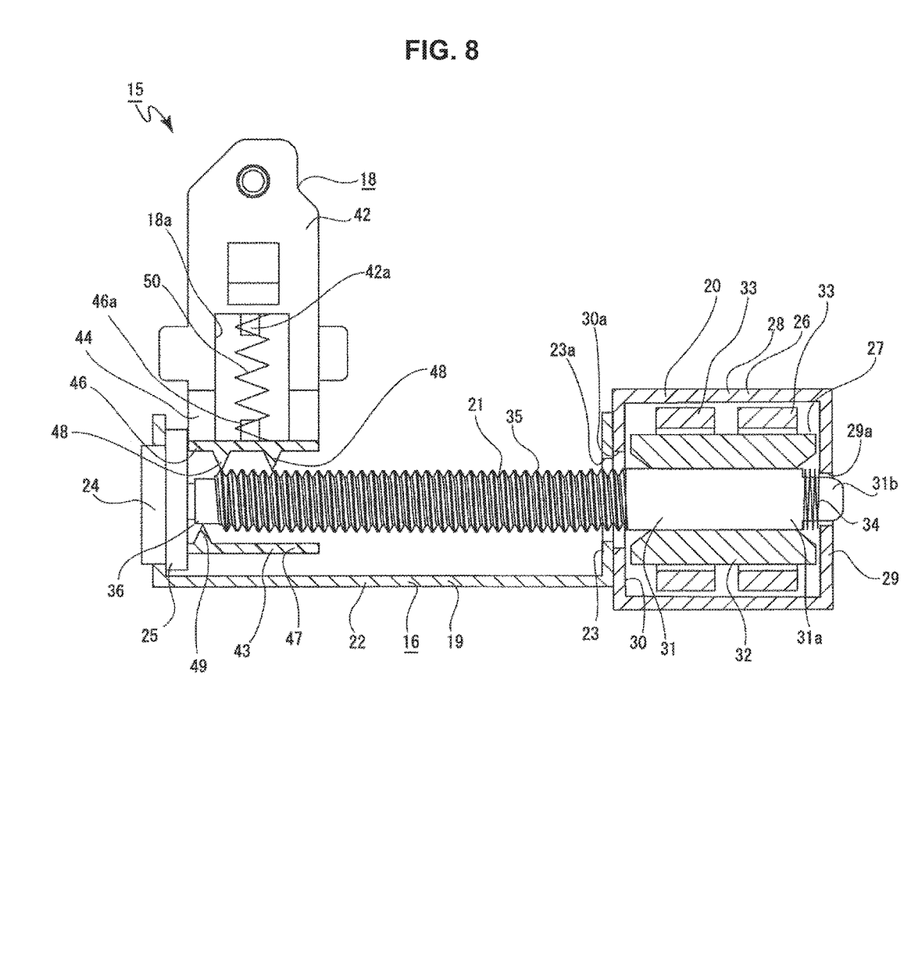
FIG. 8 is an enlarged bottom view of the optical element driving device illustrated as a partial cross section in a state where a rack is moved to a moving end of a thrust bearing side.

However, in the disk drive device 1, the end portion on the side of the thrust bearing 25 in the axial direction of the lead screw 21 is provided as the non-threaded engagement portion 36 having no thread groove. Thus, when the rack 43 is pressed against the thrust bearing 25 as described above, the state where the second tooth portion 49 is positioned facing the non-threaded engagement portion 36 and the first tooth portions 48 and 48 are threadably engaged with the threaded engagement portion 35 is maintained (refer to FIG. 8).

Figure 9:
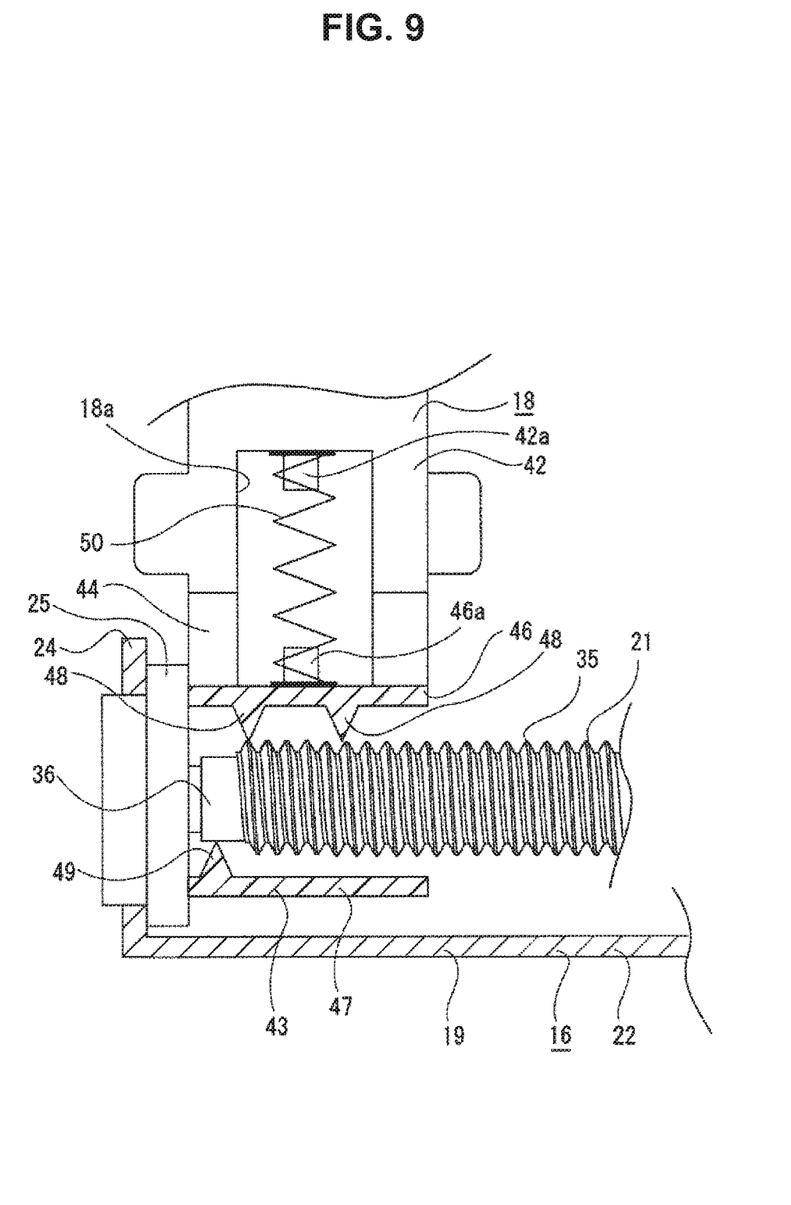
FIG. 9 is an enlarged bottom view illustrating a state where the rack is displaced with respect to the lead screw as a partial cross section.

Thus, the second tooth portion 49 is positioned facing the non-threaded engagement portion 36, and thus the rack 43 is displaced in a direction in which the first tooth portions 48 and 48 are spaced from the engagement portion 35 in the longitudinal direction with respect to the lead screw 21 in rotation, and the first tooth portions 48 and 48 are threadably engaged with the threaded engagement portion 35 while repeating tooth jump, and the rack 43 is idling with the lead screw 21 (refer to FIG. 9).

In this way, when the rack 43 is pressed against the thrust bearing 25, the rack 3 is idling with the lead screw 21. Thus, the force to move the lead screw 21 toward the drive motor 20 is not applied to the lead screw 21 and the drive unit 27 is not pressed against the inner surface of the outer blocking surface portion 29 in the casing 26, thereby preventing the occurrence of stuck. A case where the rack 43 is stopped at a position other than the original initial position by the intrusion or the like of foreign matters described above may be occurred once. But when the lead screw 21 and the rack 43 are movable at least within a certain range, the foreign matters migrates during the movement of them, and thus in most cases, they are movable to the original initial position. In the disk drive device 1, the stuck does not occur when the rack 43 is pressed against the thrust bearing 25, and thus the problem that the rack 43 is stopped at a position other than the original initial position can be easily restored in the following manner.

In other words, even when the rack 43 is pressed against the thrust bearing 25 and the rack 43 is idling with the lead screw 21 for a predetermined time, the drive motor 20 can rotate in the opposite direction because of no stuck and the lead screw 21 is reversed. In this case, the first tooth portions 48 and 48 are threadably engaged with the threaded engagement portion 35 of the lead screw 21, the rack 43 is fed toward the drive motor 20 due to the reversed rack 21, and the second tooth portion 49 is threadably engaged with the threaded engagement portion 35. Thus, the thread engagement of the rack 43 with the lead screw 21 is restored to the normal condition. When the rack 43 is stopped at the position in which the rack 43 is pressed against the thrust bearing 25 rather than the appropriate position, the position of the optical element 40 is inappropriate. Then, it is not possible to perform appropriately the recording and reproduction operation on the disk-shaped recording medium 100. However, for example, the restoration is achievable easily by performing the operations described above at the time when these problems are detected.

In addition, when the drive motor 20 is driven, the counter-electromotive force generated with the rotation of the drive motor 20 is detected by a detector (not shown). When the rack 43 that is fed toward the drive motor 20 is pressed against the motor mounting portion 23 of the mounting bracket 19, the rotation of the drive motor 20 is stopped, and thus the counter-electromotive force becomes 0 and the counter-electromotive force is no longer detected by the detector. In this way, at the time of driving the drive motor 20, when the counter-electromotive force is no longer detected by the detector, it is determined that the rack 43 is located in the initial position where the rack 43 is pressed against the motor mounting portion 23 of the mounting bracket 19. Thus, the drive motor 20 rotates in the opposite direction, and the rack 23 is moved toward the thrust bearing 25.

In this way, when the initial position of the rack 43 that is pressed against the drive motor 20 is detected, the distal end portion of the lead screw 21 is just pressed against the thrust bearing 25. Thus, unlike the case where the drive unit 27 of the drive motor 20 is pressed against the inner surface of the outer blocking surface portion 29 in the casing 26 as in the case where the rack 43 is pressed against the thrust bearing 25, the stuck is not occurred. This because the distal end portion of the lead screw 21 has a small diameter, and thus the surface roughness is easily controlled and the friction coefficient between the distal end portion and the thrust bearing 25 becomes smaller. Therefore, when the rack 43 is move toward the drive motor 20, the stuck is not occurred, and thus it is possible to determine that the movement of the rack 43 is stopped when the counter-electromotive force is not detected.

[Conclusion]

As described above, in the disk drive device 1, the first tooth portions 48 and 48 and the second tooth portion 49 are respectively positioned on opposite sides across the lead screw 21 in the rack 43, the second tooth portion 49 is positioned closer to the side of the thrust bearing 25 than the first tooth portions 48 and 48, and the non-threaded engagement portion 36 having no thread groove is formed in the lead screw 21 at an end portion of the thrust bearing 25.

Thus, the second tooth portion 49 is positioned facing the non-threaded engagement portion 36 in the state where the rack 43 is moved to the end portion of the lead screw 21 on the side of the thrust bearing 25. Thus, it is possible to prevent the occurrence of stuck in the drive motor 20 without increasing the number of components and it is possible to restore the thread engagement of the rack 43 with the lead screw 21 to the normal condition.

In addition, it is possible to prevent the occurrence of stuck by forming the non-threaded engagement portion 36 in the lead screw 21. Thus, it is not necessary to provide a control system that incorporates software including a mechanism for escaping from the stuck that has been occurred or a specific sequence for only the purpose of escaping it, thereby reducing the manufacturing cost of the disk drive device 1.

Moreover, a system for preventing the occurrence of stuck is not used by detecting the position of the rack 43 and controlling the movement range of the rack 43, and thus it is not necessary to use a sensor such as photo-interrupter for detecting the position, thereby further reducing the manufacturing cost of the disk drive device 1.

In addition, in the state where the rack 43 is moved to the end portion of the lead screw 21 on the side of the thrust bearing 25, the first tooth portions 48 and 48 are threadably engaged with the threaded engagement portion 35 and the second tooth portion 49 is positioned facing the non-threaded engagement portion 36. Thus, it is possible to reliably restore the thread engagement of the rack 43 with the lead screw 21 to the normal condition.

Furthermore, the first tooth portions 48 and 48 are provided with the pressing spring 50 used for the first tooth portions 48 and 48 to be biased in a direction to be pressed against the threaded engagement portion 35. Thus, the rack 43 is fed with the rotation of the lead screw 21 in the state where the first tooth portions 48 and 48 are pressed against the threaded engagement portion 35, and it is possible to move the rack 43 reliably.

Further, the biasing spring 34 for biasing the drive unit 27 and the lead screw 21 toward the thrust bearing 25 is provided inside the casing 26 in the drive motor 20. Thus, the lead screw 21 rotates in the state of being typically pressed against the thrust bearing 25 in a normal condition, and it is possible to improve the positional accuracy of the optical element 40.

In addition, the biasing spring 34 is provided inside the casing 26, and thus it is not necessary to provide a space for arranging the biasing spring 34 on the outside of the casing 26, thereby achieving space saving and reducing the size of the optical element driving device 15. This is because the biasing spring 34 is deformed when the rack 43 is pressed against the thrust bearing and thus the stuck is not occurred even when the drive unit 27 of the drive motor 20 is pressed against the inner surface of the outer blocking surface portion 29 in the casing 26 and the small sized biasing spring 34 can be used.

Further, the first tooth portions 48 and 48 are biased against the element holder 17 toward the lead screw 21 by the pressing spring 50, and the first tooth portions 48 and 48 are positioned closer to the side of the element holder 17 than the second tooth portion 49. Thus, the pressing spring 50 is positioned closer to the side of the element holder 17 than the lead screw 21, and it is necessary to provide only a short pressing spring 50, thereby simplifying the structure of the optical element driving device 15.

It is also possible to configure the optical element driving device so that the first tooth portion is biased against the lead screw 21 in the state where the second tooth portion is positioned closer to the side of the element holder 17 than the first tooth portion. Such a structure can be achieved by providing the second tooth portion in the toothed portion on the side of the element holder in the coupling member, providing the first tooth portion in the toothed portion on the opposite side of the element holder, and supporting a tension coil spring between the attached portion and the toothed portion provided with the first tooth portion.

Additionally, in the disk drive device 1, the base surface portion 45, the first toothed portion 46, and the second toothed portion 47 are integrally formed in the rack 43, and the first tooth portions 48 and 48 and the second tooth portion 49 are integrally formed in the first toothed portion 46 and the second toothed portion 47, respectively. Thus, the respective portions of the rack 43 are formed integrally and the number of components can be reduced, thereby reducing the manufacturing cost.

[Others]

Although the above description has been given an example of the optical element driving device 15 that moves a collimator lens as the optical element 40, the optical element to be moved by the optical element driving device is not limited to the collimator lens, and it may be any optical element such as other lens.

In addition, it is not limited to the configuration in which the optical pickup 7 is provided with the optical element driving device, and the configuration for the movement of an imaging device such as still camera and video camera, various lenses used in a camera module incorporated in a mobile terminal, and an optical element such as diaphragm.

[Present Technology]

Additionally, the present technology may also be configured as below.

(1) An optical pickup including:
  a light source configured to emit a light beam;
  an objective lens configured to focus the light beam emitted from the light source onto a recording surface of a disk-shaped recording medium;
  an optical element arranged between the light source and the objective lens, the optical element having predetermined refractive power; and
  an optical element driving device configured to move the optical element along an optical axis direction,
  wherein the optical element driving device includes
  a lead screw having a threaded engagement portion with a thread groove formed in the threaded engagement portion,
  a drive unit configured to allow the lead screw to rotate,
  a thrust bearing configured to support an end portion of the lead screw on a side opposite to the drive unit in an axial direction of the lead screw, and
  a rack having a plurality of first tooth portions provided spaced apart in the axial direction to be threadably engaged with the threaded engagement portion and a second tooth portion provided closer to the thrust bearing in the axial direction than the first tooth portion to be threadably engaged with the threaded engagement portion, the first tooth portion and the second tooth portion being positioned on opposite sides across the lead screw, the rack being moved in the axial direction with a rotation of the lead screw,
  wherein the lead screw includes a non-threaded engagement portion formed at the end portion of the lead screw on the thrust bearing side, the non-threaded engagement portion having no thread groove.

(2) The optical pickup according to (1),
  wherein the first tooth portion is threadably engaged with the threaded engagement portion of the lead screw and the second tooth portion faces the non-threaded engagement portion of the lead screw when the rack is moved closest to the thrust bearing within a movable range of the rack.

(3) The optical pickup according to (1) or (2),
  wherein the first tooth portion and the second tooth portion are both threadably engaged with the threaded engagement portion of the lead screw when the rack is moved closest to the drive unit within a movable range of the rack.

(4) The optical pickup according to any of (1) to (3), further including:
  a pressing spring configured to allow the first tooth portion to be biased in a direction to be pressed against the threaded engagement portion.

(5) The optical pickup according to any of (1) to (4),
  wherein the rack is provided with a base surface portion and a pair of toothed portions projecting respectively from both end portions of the base surface portion,
  wherein the base surface portion and the pair of toothed portions are integrally formed, and
  wherein the first tooth portion and the second tooth portion are integrally formed respectively in the pair of toothed portions.

(6) The optical pickup according to any of (1) to (5),
  wherein the drive unit is a drive unit of a stepping motor.

(7) The optical pickup according to any of (1) to (6),
wherein the optical pickup is provided with a detector configured to detect counter-electromotive force generated with a rotation of the drive unit, and
wherein, when the rack is moved toward the drive unit and no counter-electromotive force is detected by the detector, a direction of rotation of the drive unit is reversed and the rack is moved toward the thrust bearing.

(8) A disk drive device including:
an optical pickup configured to be moved in a radial direction of a disk-shaped recording medium; and
a disk table having the disk-shaped recording medium mounted on the disk table, wherein the optical pickup includes
a light source configured to emit a light beam,
an objective lens configured to focus the light beam emitted from the light source onto a recording surface of a disk-shaped recording medium,
an optical element arranged between the light source and the objective lens, the optical element having predetermined refractive power, and
an optical element driving device configured to move the optical element along an optical axis direction,
wherein the optical element driving device includes
a lead screw having a threaded engagement portion with a thread groove formed in the threaded engagement portion,
a drive unit configured to allow the lead screw to rotate,
a thrust bearing configured to support an end portion of the lead screw on a side opposite to the drive unit in an axial direction of the lead screw, and
a rack having a plurality of first tooth portions provided spaced apart in the axial direction to be threadably engaged with the threaded engagement portion and a second tooth portion provided closer to the thrust bearing in the axial direction than the first tooth portion to be threadably engaged with the threaded engagement portion, the first tooth portion and the second tooth portion being positioned on opposite sides across the lead screw, the rack being moved in the axial direction with a rotation of the lead screw,
wherein the lead screw includes a non-threaded engagement portion formed at the end portion of the lead screw on the thrust bearing side, the non-threaded engagement portion having no thread groove.

(9) The disk drive device according to (8),
wherein the disk drive device is provided with a detector configured to detect counter-electromotive force generated with a rotation of the drive unit, and
wherein, when the rack is moved toward the drive unit and no counter-electromotive force is detected by the detector, a direction of rotation of the drive unit is reversed and the rack is moved toward the thrust bearing.

(10) An optical element driving device including:
a lead screw having a threaded engagement portion with a thread groove formed in the threaded engagement portion;
a drive unit configured to allow the lead screw to rotate;
a thrust bearing configured to support an end portion of the lead screw on a side opposite to the drive unit in an axial direction of the lead screw; and
a rack having a plurality of first tooth portions provided spaced apart in the axial direction to be threadably engaged with the threaded engagement portion and a second tooth portion provided closer to the thrust bearing in the axial direction than the first tooth portion to be threadably engaged with the threaded engagement portion, the first tooth portion and the second tooth portion being positioned on opposite sides across the lead screw, the rack being moved in the axial direction with a rotation of the lead screw,
wherein the lead screw includes a non-threaded engagement portion formed at the end portion of the lead screw on the thrust bearing side, the non-threaded engagement portion having no thread groove.

REFERENCE SIGNS LIST 1 disk drive device
4 disk table
7 optical pickup
8 moving base
9 objective lens driving device
12 light emitting portion
14 light receiving portion
15 optical element driving device
17 element holder
19 mounting bracket
20 drive motor
21 lead screw
26 casing
27 drive unit
30a insertion hole
34 biasing spring
35 threaded engagement portion
36 non-threaded engagement portion
40 optical element
43 rack
45 base surface portion
46 first toothed portion
47 second toothed portion
48 first tooth portion
49 second tooth portion
50 pressing spring
100 disk-shaped recording medium

The invention claimed is:
1. An optical pickup, comprising:
a light source configured to emit a light beam;
an objective lens configured to focus the light beam emitted from the light source onto a recording surface of a disk-shaped recording medium;
an optical element arranged between the light source and the objective lens, the optical element having predetermined refractive power; and
an optical element driving device configured to move the optical element along an optical axis direction,
wherein the optical element driving device includes:
a lead screw having a threaded engagement portion with a thread groove formed in the threaded engagement portion,
a drive unit configured to allow the lead screw to rotate,
a thrust bearing configured to support an end portion of the lead screw on a side opposite to the drive unit in an axial direction of the lead screw, and
a rack having a plurality of first tooth portions provided spaced apart in the axial direction to be threadably engaged with the threaded engagement portion and a second tooth portion provided closer to the thrust bearing in the axial direction than at least one first tooth portion of the plurality of first tooth portions to be threadably engaged with the threaded engagement portion, wherein the at least one first tooth portion and the second tooth portion are positioned on opposite sides across the lead screw, wherein the rack is moved in the axial direction with a rotation of the lead screw, wherein the lead screw includes a non-threaded engagement portion formed at the end portion of the lead screw on the side of the thrust bearing, the non-threaded engagement portion having no thread groove.

2. The optical pickup according to claim 1, wherein the at least one first tooth portion is threadably engaged with the threaded engagement portion of the lead screw and the second tooth portion faces the non-threaded engagement portion of the lead screw when the rack is moved closest to the thrust bearing within a movable range of the rack.

3. The optical pickup according to claim 1, wherein the at least one first tooth portion and the second tooth portion are both threadably engaged with the threaded engagement portion of the lead screw when the rack is moved closest to the drive unit within a movable range of the rack.

4. The optical pickup according to claim 1, further comprising:
a pressing spring configured to allow the at least one first tooth portion to be biased in a direction to be pressed against the threaded engagement portion.

5. The optical pickup according to claim 1,
wherein the rack is provided with a base surface portion and a pair of toothed portions projecting respectively from both end portions of the base surface portion,
wherein the base surface portion and the pair of toothed portions are integrally formed, and
wherein the at least one first tooth portion and the second tooth portion are integrally formed respectively in the pair of toothed portions.

6. The optical pickup according to claim 1, wherein the drive unit is a drive unit of a stepping motor.

7. The optical pickup according to claim 1,
wherein the optical pickup is provided with a detector configured to detect counter-electromotive force generated with a rotation of the drive unit, and
wherein, when the rack is moved toward the drive unit and no counter-electromotive force is detected by the detector, a direction of rotation of the drive unit is reversed and the rack is moved toward the thrust bearing.

8. A disk drive device, comprising:
an optical pickup configured to be moved in a radial direction of a disk-shaped recording medium; and
a disk table having the disk-shaped recording medium mounted on the disk table,
wherein the optical pickup includes:
a light source configured to emit a light beam,
an objective lens configured to focus the light beam emitted from the light source onto a recording surface of a disk-shaped recording medium,
an optical element arranged between the light source and the objective lens, the optical element having predetermined refractive power, and
an optical element driving device configured to move the optical element along an optical axis direction,
wherein the optical element driving device includes:
a lead screw having a threaded engagement portion with a thread groove formed in the threaded engagement portion,
a drive unit configured to allow the lead screw to rotate,
a thrust bearing configured to support an end portion of the lead screw on a side opposite to the drive unit in an axial direction of the lead screw, and
a rack having a plurality of first tooth portions provided spaced apart in the axial direction to be threadably engaged with the threaded engagement portion and a second tooth portion provided closer to the thrust bearing in the axial direction than at least one first tooth portion of the plurality of first portions to be threadably engaged with the threaded engagement portion, wherein the at least one first tooth portion and the second tooth portion are positioned on opposite sides across the lead screw, wherein the rack is moved in the axial direction with a rotation of the lead screw,
wherein the lead screw includes a non-threaded engagement portion formed at the end portion of the lead screw on the side of the thrust bearing, the non-threaded engagement portion having no thread groove.

9. The disk drive device according to claim 8,
wherein the disk drive device is provided with a detector configured to detect counter-electromotive force generated with a driving of the drive unit, and
wherein, when the rack is moved toward the drive unit and no counter-electromotive force is detected by the detector, a direction of rotation of the drive unit is reversed and the rack is moved toward the thrust bearing.

10. An optical element driving device, comprising:
a lead screw having a threaded engagement portion with a thread groove formed in the threaded engagement portion;
a drive unit configured to allow the lead screw to rotate;
a thrust bearing configured to support an end portion of the lead screw on a side opposite to the drive unit in an axial direction of the lead screw; and
a rack having a plurality of first tooth portions provided spaced apart in the axial direction to be threadably engaged with the threaded engagement portion and a second tooth portion provided closer to the thrust bearing in the axial direction than at least one first tooth portion of the plurality of first tooth portions to be threadably engaged with the threaded engagement portion, wherein the at least one first tooth portion and the second tooth portion are positioned on opposite sides across the lead screw, wherein the rack is moved in the axial direction with a rotation of the lead screw,
wherein the lead screw includes a non-threaded engagement portion formed at the end portion of the lead screw on the side of the thrust bearing, the non-threaded engagement portion having no thread groove.

* * * * *